United States Patent [19]

Dennison

[11] Patent Number: 4,718,823
[45] Date of Patent: Jan. 12, 1988

[54] PITCH CHANGING MECHANISM FOR FAN BLADES

[75] Inventor: William T. Dennison, Vernon, Conn.

[73] Assignee: United Technologies Corporation, Harford, Conn.

[21] Appl. No.: 18,117

[22] Filed: Feb. 24, 1987

[51] Int. Cl.[4] .......................................... B64C 11/38
[52] U.S. Cl. ................................. 416/162; 416/168 R; 415/129
[58] Field of Search ............... 416/162, 168 R, 168 A; 415/129, 130

[56] References Cited

U.S. PATENT DOCUMENTS

| 2,440,046 | 4/1948 | Hautier. | |
|---|---|---|---|
| 3,056,457 | 10/1962 | MacFarland. | |
| 3,487,880 | 4/1967 | Davies et al. | 416/157 |
| 3,687,569 | 8/1972 | Lompas | 416/156 |
| 3,869,221 | 3/1975 | Wilder | 60/226.1 |
| 3,873,235 | 3/1975 | Mendelson | 416/162 |
| 3,873,236 | 3/1975 | Gall | 416/162 |
| 3,922,852 | 12/1975 | Drabek | 416/162 X |
| 3,924,404 | 12/1975 | Pollert | 416/193 R X |
| 4,090,812 | 5/1978 | Moran | 416/150 |
| 4,534,705 | 8/1985 | Selestam | 416/168 A X |
| 4,657,484 | 4/1987 | Wakeman et al. | 416/162 X |

FOREIGN PATENT DOCUMENTS

| 558073 | 6/1957 | Belgium. | |
|---|---|---|---|
| 846622 | 8/1960 | United Kingdom. | |
| 2145777 | 4/1985 | United Kingdom | 416/157 B |

Primary Examiner—Everette A. Powell, Jr.
Attorney, Agent, or Firm—Charles A. Warren

[57] ABSTRACT

A non-rotating actuating system for pitch control of a fan in a bypass turbine engine in which the actuating sleeve, that rotates with a fan and is moved axially to change to the pitch ofthe fan blade, is supported by a part of the fixed structure thereby to minimize loading of the disc supporting structure.

5 Claims, 1 Drawing Figure

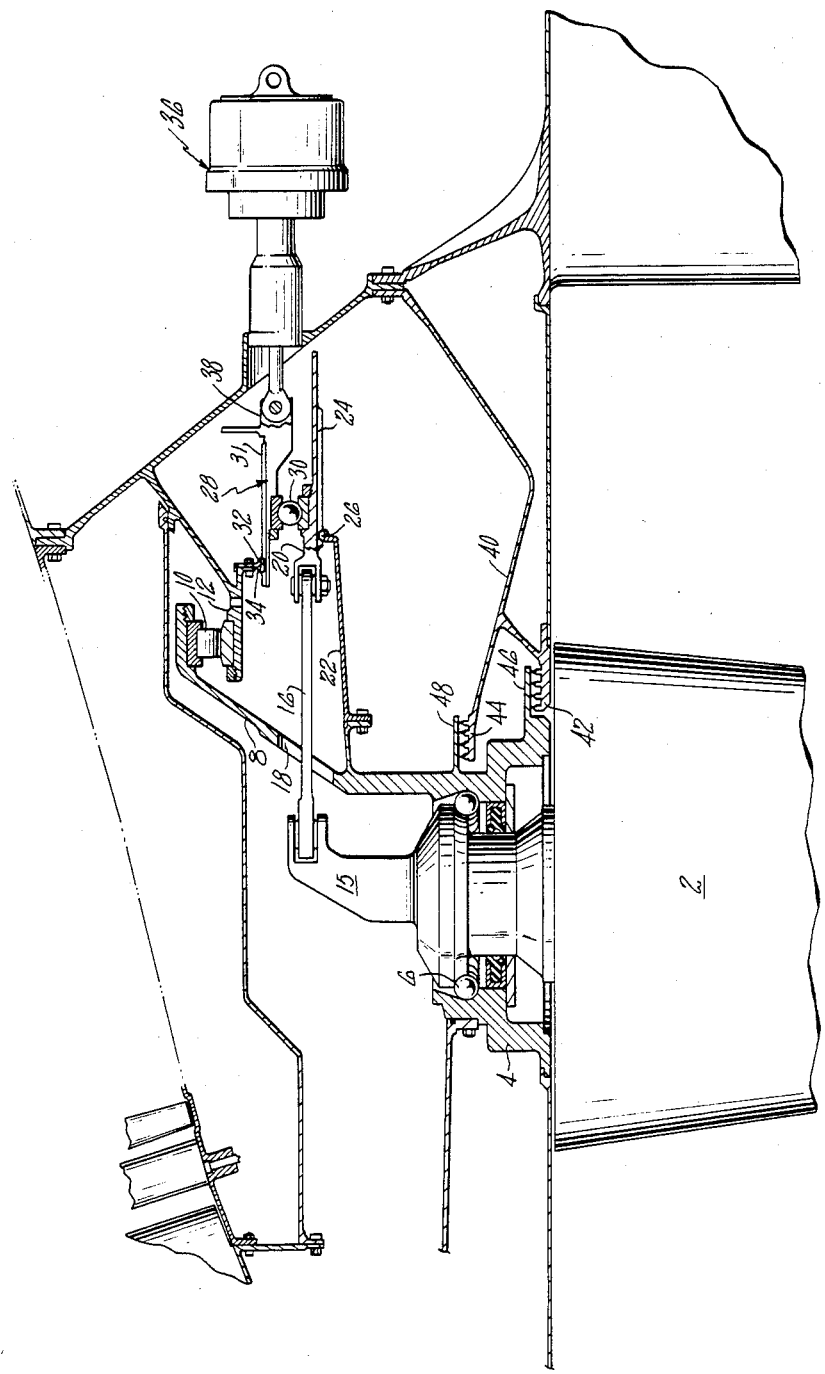

PITCH CHANGING MECHANISM FOR FAN BLADES

DESCRIPTION

1. Technical Field

This invention is an actuating structure for changing the pitch of a row of fan blades in a bypass turbine engine and is particularly useful where the fan surrounds the basic structure of the engine.

2. Background Art

Where the fan is mounted in surrounding relation to the compressor case of a bypass engine, the construction of the actuating structure is critical If the actuators are mounted on the supporting ring structure for the fan blades, the high centrifugal loads increase the load on the ring and necessitate a heavier support structure for the blades. Not only is there a high centrifugal load, but the feedback from the actuator to the static points from which the device is controlled results in complications.

DISCLOSURE OF INVENTION

Accordingly, a feature of the present invention is an actuator for the fan blades in which the rotating and axially movable actuating ring that is connected to the individual blades by links is supported by rotation independently of the blade support disc and is moved axially to change the blade pitch of all the blades in unison by a non-rotating sleeve connected to the actuating ring by a thrust bearing and supported from the static structure. Cooperating splines on the sleeve and the fixed support hold the actuating sleeve against rotation. The sleeve itself is caused to move axially by a number of circumferentially spaced synchronized actuator devices. Another feature of the invention is the splining of the rotating sleeve to an extension of the blade support disc so that the disc and ring rotate in unison.

The foregoing and other features and advantages of the present invention will become more apparent from the following description and accompanying drawing.

BRIEF DESCRIPTION OF THE DRAWING

The single FIGURE is a fragmentary longitudinal sectional view through the blade support disc and the blade actuating structure.

BEST MODE FOR CARRYING OUT THE INVENTION

The blades and supporting disc have been described in the co-pending application, Ser. No. 010,237 filed Feb. 2, 1987. The blades 2 in the row of blades have their roots located in radial openings in a disc 4 on bearings 6 to permit each of the blades to rotate on its radial axis for the purpose of changing the pitch of the blade. The disc 4 has an integral inwardly extending flange 8 having a cylindrical inner end on which a bearing 10 is positioned. This bearing engages a fixed supporting structure 12 forming a part of the engine case and the disc is supported for rotation within the supporting structure by this bearing arrangement.

Each blade carries at its inner end a crank arm 15 and each crank arm is connected to an actuating link 16 extending rearwardly from the crank arm. The several links extend through openings 18 in the flange 8 large enough to permit the necessary rocking movements of the links as the blades are actuated. The rearward ends of the links are connected to an actuating ring 20 supported for axial sliding movement within a supporting element 22 extending rearwardly from the flange in surrounding relation to the links on the ring. Cooperating splines 24 and 26 on the outer surface of the ring 20 and on the cooperating element 22 assure the rotation of the ring 20 with the blade supporting disc and permit the necessary axial movement of the ring 20 to actuate the blades in pitch changing.

A fixed sleeve 28 is supported within the ring 20 by a thrust bearing 30 which permits the ring 20 to rotate around the sleeve, but which causes the sleeve and the ring to move axially in unison. The sleeve 28 is kept from rotation by cooperating splines 31 and 32 on the inside surface of the sleeve and on a support flange 34 on the fixed supporting structure 12.

The sleeve 28 is moved axially by suitable translating devices 36 connected to axially extending links 38 on the sleeve. The devices 36 may be of any suitable construction. It should be noted that the several circumferentially spaced devices are all caused to move in unison so that the sleeve will be readily moved axially as a unit. For example, the several devices 36 may be three geared-ball screw actuators connected together and driven by a flexible cable shaft system. Such devices are well-known and will not be described.

Although not a part of the invention, the drawing shows a seal support structure 40 mounted on a part of the fixed structure 12 and extending forwardly therefrom in surrounding relation to the sleeve 28 and ring 20. This structure 40 carries sealing elements 42 and 44 and is positioned in cooperating sealing arrangement with sealing rings 46 and 48 on the blade support disc 4.

Although this invention has been shown and described with respect to detailed embodiments thereof, it will be understood by those skilled in the art that various changes in form and detail thereof may be made without departing from the spirit and scope of the claimed invention.

I claim:

1. A variable pitch control for a bypass fan in a turbine engine installation including:
   a row of fan blades, each having at its inner end a crank arm by which the pitch of the fan may be changed,
   a supporting ring for the fan blades, each blade being mounted at its base in the ring and in a position to rotate on a radial axis,
   a fixed support structure for the ring, a first bearing supporting the ring to rotate on the fixed structure,
   a translatable sleeve splined to the support ring to rotate therewith and to slide axially relative thereto, a row of links connecting said sleeve with the crank arms and the blades, and each link being pivotally attached to the sleeve at one end and to the crank arm at the other end,
   a non-rotating translatable actuating sleeve within said first sleeve,
   a second bearing between said sleeves to cause said sleeves to move axially in unison,
   splines between the fixed structure and said second sleeve to support the second sleeve against rotation and means for actuating said second sleeve axially to change the pitch of the blades in unison.

2. A control as in claim 1 in which the ring has an integrally extending flange terminating within a support flange on the fixed support structure with the first bearing positioned between the end of the inwardly extending flange and the support flange on the fixed support structure.

3. A control as in claim 2 in which the inwardly extending flange has openings therethrough for accepting the connecting links.

4. A control as in claim 1 in which the second bearing is a thrust bearing between the sleeves.

5. A control as in claim 1 in which the support ring has a lateral flange surrounding the links and carrying thereon splines engaging with cooperating splines on the first sleeve.

* * * * *